US012749856B2

(12) United States Patent
Eroglu et al.

(10) Patent No.: US 12,749,856 B2
(45) Date of Patent: Sep. 29, 2026

(54) CONNECTOR DEVICE FOR CONNECTING TO AT LEAST ONE COMPONENT

(71) Applicant: Bayerische Motoren Werke Aktiengesellschaft, Munich (DE)

(72) Inventors: Fatih Eroglu, Munich (DE); Dominik Wild, Munich (DE); Michael Zink, Ried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 359 days.

(21) Appl. No.: 18/697,774

(22) PCT Filed: Nov. 28, 2022

(86) PCT No.: PCT/EP2022/083387
§ 371 (c)(1),
(2) Date: Apr. 2, 2024

(87) PCT Pub. No.: WO2023/110373
PCT Pub. Date: Jun. 22, 2023

(65) Prior Publication Data

US 2024/0413587 A1 Dec. 12, 2024

(30) Foreign Application Priority Data

Dec. 16, 2021 (DE) ..................... 10 2021 133 397.0

(51) Int. Cl.
*H01R 13/6582* (2011.01)
*H01R 13/627* (2006.01)
*H01R 13/6598* (2011.01)

(52) U.S. Cl.
CPC ..... *H01R 13/6582* (2013.01); *H01R 13/6271* (2013.01); *H01R 13/6598* (2013.01)

(58) Field of Classification Search
CPC ............ H01R 13/6582; H01R 13/6271; H01R 13/6598
(Continued)

(56) References Cited

U.S. PATENT DOCUMENTS 4,810,210 A * 3/1989 Komatsu ............ H01R 13/6582 439/352
4,929,189 A * 5/1990 Sekiguchi ........ H01R 13/65912 439/352
(Continued)

FOREIGN PATENT DOCUMENTS

DE 20 2009 015 590 U1 3/2010
DE 10 2019 134 645 A1 6/2021
(Continued)

OTHER PUBLICATIONS

International Search Report (PCT/ISA/210) issued in PCT Application No. PCT/EP2022/083387 dated Mar. 17, 2023 with English translation (6 pages).
(Continued)

*Primary Examiner* — Gary F Paumen
(74) *Attorney, Agent, or Firm* — Crowell & Moring LLP

(57) ABSTRACT

A connector device for connecting to at least one component has a main body, a receiver and/or transmitter device arranged on the main body for receiving and/or transmitting signals and/or data, and a shielding device. The shielding device is arranged so as to be movable relative to the base body and has a shield for electromagnetic shielding of the receiver and/or transmitter device. The shielding device further includes a latch for latching the connector device with the component to be connected in a latching position, and a lock for securing the latch in the latching position. In the latching position, the receiver and/or transmitter device is not shielded by the shield.

11 Claims, 5 Drawing Sheets

(58) Field of Classification Search
USPC .......................................... 439/607.01, 352
See application file for complete search history.

(56) References Cited

U.S. PATENT DOCUMENTS

| | | | | |
|---|---|---|---|---|
| 8,029,024 | B2 | 10/2011 | Guest | |
| 8,968,021 | B1 * | 3/2015 | Kennedy | H01R 13/641 439/352 |
| 2009/0295152 | A1 * | 12/2009 | Guest | F16L 37/0926 285/323 |
| 2016/0258563 | A1 | 9/2016 | Danielson et al. | |

FOREIGN PATENT DOCUMENTS

| | | | |
|---|---|---|---|
| WO | WO 2019/126447 | A1 | 6/2019 |
| WO | WO 2021/148737 | A1 | 7/2021 |

OTHER PUBLICATIONS

German-language Written Opinion (PCT/ISA/237) issued in PCT Application No. PCT/EP2022/083387 dated Mar. 17, 2023 with English translation (8 pages).

German-language Search Report issued in German Application No. 10 2021 133 397.0 dated Aug. 12, 2022 with partial English translation (11 pages).

* cited by examiner

CONNECTOR DEVICE FOR CONNECTING TO AT LEAST ONE COMPONENT

BACKGROUND AND SUMMARY

A connector device, having a transmitting and/or receiving device, for connecting to at least one component is disclosed.

Connectors or component connectors for connecting two components are known in the prior art.

Document DE 10 2019 134 645 describes for example a connector device for connecting to at least one component. The connector device has a main body having a component connection portion, a receiving and/or transmitting device for receiving and/or transmitting signals and/or data, and a shielding element for the electromagnetic shielding of the receiving and/or transmitting device. The connector device is designed such that the shielding element is moved by connection of a component to the component connection portion from a first position, in which the receiving and/or transmitting device is shielded by the shielding element, into a second position, in which the receiving and/or transmitting device is free of shielding by the shielding element.

Therefore, an object to be achieved by at least some embodiments is that of providing a connector device for connecting to at least one component, which connector device can be realized by a particularly simple assembly process and/or prevents so-called pseudo-latching.

This object is achieved by subject matter according to the independent claims. Advantageous embodiments and developments of the subject matter can also be found in the dependent claims, the description below, and the drawings.

For connecting to at least one component, a connector device is proposed having a main body, which exhibits an attached receiving and/or transmitting device for transmitting/receiving signals and/or data. The main body can for example contain a plastic or consist of a plastic. Furthermore, the main body can have a substantially cylindrical shape, in particular a hollow cylindrical shape. The main body preferably has a component connection portion, which is provided to connect the main body to the component to be connected, wherein the component can, in particular, be in direct contact with the main body in the region of the component connection portion. The receiving and/or transmitting device can be designed for example as an RFID transponder (RFID, "radio-frequency identification" or "identification with the aid of electromagnetic waves"). The RFID transponder is preferably designed such that contactless data exchange can take place between a receiver unit or a reader in the surroundings and the RFID transponder that is not shielded by the shielding element.

Furthermore, the connector device has a shielding device, which is arranged movably relative to the main body. In particular, the shielding device can be displaceable axially relative to the main body or displaceable along a longitudinal axis of the main body. The shielding device can, for example, be sleeve-like. Furthermore, the shielding device can in particular be designed in multiple parts.

The shielding device has a shielding element for the electromagnetic shielding of the receiving and/or transmitting device. Preferably, the shielding element contains a metal or a metal alloy or consists of a metal or a metal alloy. The shielding element is preferably sleeve-like.

Furthermore, the shielding device has a latch for latching the connector device to the component to be connected in a latching position. The latch can be designed for example as latching grooves or latching hooks or latching notches.

Preferably, the component likewise has at least one latch, which is in engagement with the latch of the main body after the component is latched to the main body.

The shielding device also has a lock for securing the latch in the latching position. Preferably, the lock is designed such that, when in a locking position, it fixes the latch in the latching position. This allows securing against unintentional opening of the latch after the connector device is assembled.

In the latching position, the receiving and/or transmitting device is free of shielding by the shielding element of the shielding device. In the latching position, the shielding device or the shielding element is preferably in a location in which the receiving and/or transmitting device is not shielded by the shielding device or by the shielding element. By means of the latch, the shielding device can be fixed in this latching position or location.

According to a further embodiment, the receiving and/or transmitting device is connected to the main body such that the receiving and/or transmitting device covers the entire circumference of the main body in a connection region. For example, the receiving and/or transmitting device can be connected to the main body by means of an adhesive bond.

According to a further embodiment, the connector device has a spring element, which is designed, when the shielding device is not in the latching position, to arrange the shielding device such that the receiving and/or transmitting device is shielded by the shielding device. In other words, the connector device can be designed such that the receiving and/or transmitting device is not shielded by the shielding element only when the latch of the shielding device is in engagement with the latch of the component, in particular in the structurally defined position.

Furthermore, the main body can have a further component connection portion for connecting the connector device to a further component. The further component can be a hose, for example. The further component connection portion can be formed for example on an end of the main body opposite the component connection portion. Furthermore, the further component connection portion can have connection means or latching means for securely connecting the main body to the second component.

According to a further embodiment, the connector device is designed for connecting to a component that is designed as a vent pipe for a battery. At least one sealing element such as a sealing ring can be arranged between a connector device connected to a component or vent pipe and the component or vent pipe.

According to a further embodiment, the shielding element of the shielding device is designed as a metal sleeve. Furthermore, the shielding device can have a receiving sleeve, which has the locking device of the shielding device. Preferably, the receiving sleeve and metal sleeve are connected fixedly to one another, in particular in a rotationally fixed or non-rotatable manner. For example, the receiving sleeve can be arranged inside the metal sleeve. The receiving sleeve preferably contains a plastic or consists of plastic. The lock of the receiving sleeve can be formed for example on an end of the receiving sleeve. For example, the lock can be formed by protruding or projecting faces or elements. By means of the lock, the latch of the shielding device can be held or secured in the latching position.

Furthermore, the shielding device can have a clip ring, which has the latch of the shielding device. The latch can, for example, be designed as latching hooks on the clip ring, which protrude from the clip ring.

According to a particularly preferred embodiment, the shielding device is designed in multiple parts and has a metal sleeve designed as a shielding element, a receiving sleeve for receiving the metal sleeve, and a clip ring, which comprises the latch. The receiving sleeve preferably has the lock of the shielding device. Preferably, the clip ring is arranged in the interior of the receiving sleeve, which can be arranged in particular in the interior of the metal sleeve. Particularly preferably, the shielding device is designed in three parts. Preferably, the receiving sleeve, the metal sleeve and the clip ring are connected to one another in a rotationally fixed or non-rotatable manner. The clip ring is preferably axially movable relative to the receiving sleeve and/or metal sleeve, i.e., movable along a longitudinal axis of the main body. The metal sleeve and the receiving sleeve are preferably connected to one another such that they cannot be displaced relative to one another in the axial direction.

According to a further embodiment, the main body has an unlocking device, which is designed to bring the latching device of the shielding device or of the clip ring out of the latching position. The unlocking device can have for example one or more slopes or sloping faces protruding from the main body, which protrude from the main part of the main body. Preferably, the unlocking device is designed such that, as a result of a rotation of the metal sleeve and/or the receiving sleeve, the clip ring rotated by the rotation is pushed onto the protruding slopes, causing opening of the latch, as a result of which the latching is undone.

By means of the connector device described here, a very simple assembly process is realized, specifically simply by pushing on the shielding device or the metal sleeve, while simultaneously ensuring correct installation. In particular, in contrast to the prior art, possible pseudo-latching is prevented in this design, i.e., it cannot be incorrectly assumed that a correct connection has been made when this is not the case.

The connector device is preferably a multi-part component with a latching mechanism that connects the component to be connected to a second component when in the installed state. The shielding element or the metal sleeve can conceal or shield the receiving and/or transmitting device until correct latching has taken place. The receiving and/or transmitting device is exposed by the shielding device or the shielding element and is thus readable only after correct installation. The shielding device or the receiving sleeve of the shielding device simultaneously ensures securing against unintentional undoing of the clipping or latching of the latch and is used for unlatching or opening and/or undoing of the connection. Via the spring element or spring, the delivered state (receiving and/or transmitting device covered by shielding element or metal sleeve) is always produced as long as there is no latching/connection.

The shielding element or the metal sleeve ensures shielding of the receiving and/or transmitting device and therefore preferably consists of metal or another material that shields or absorbs the radiation/waves.

The receiving sleeve for receiving the metal sleeve is connected fixedly to the metal sleeve and has a guide rail for the clip ring. By means of the lock, it ensures securing against unintentional opening of the latch or latching hooks of the clip ring after assembly.

In the delivered and thus not installed state, the spring element or spring ensures that the clip ring, the receiving sleeve and the metal sleeve are and remain positioned such that the receiving and/or transmitting device is shielded and is not readable.

The main body of the connector device acts as a holder for the spring, the clip ring, the metal sleeve and the receiving sleeve, and as an axial guide. At the same time, the main body of the connector device is used as a central connection point, i.e., ensures the connection and its function. In media-conducting connections, this means that the connection of two components is realized via the main body of the connector device, and the media are conducted in same. The remaining components are used to fix the connection and to ensure correct installation.

The clip ring is preferably equipped with latching hooks as the latch and ensures the form-fitting connection between the main body of the connector device and the counterpart or component to be connected.

The spring element, the clip ring, the receiving sleeve and the metal sleeve are preferably arranged movably, in particular axially movably, on the main body of the connector device.

Further advantages and advantageous embodiments of the connector device described here for connecting two components can be found in the embodiment described below in connection with the figures.

In the exemplary embodiments and figures, constituents that are the same or have the same effect can each be provided with the same reference signs. The elements shown and their relative sizes should not necessarily be regarded as being to scale.

DETAILED DESCRIPTION OF THE DRAWINGS

Figure 1:
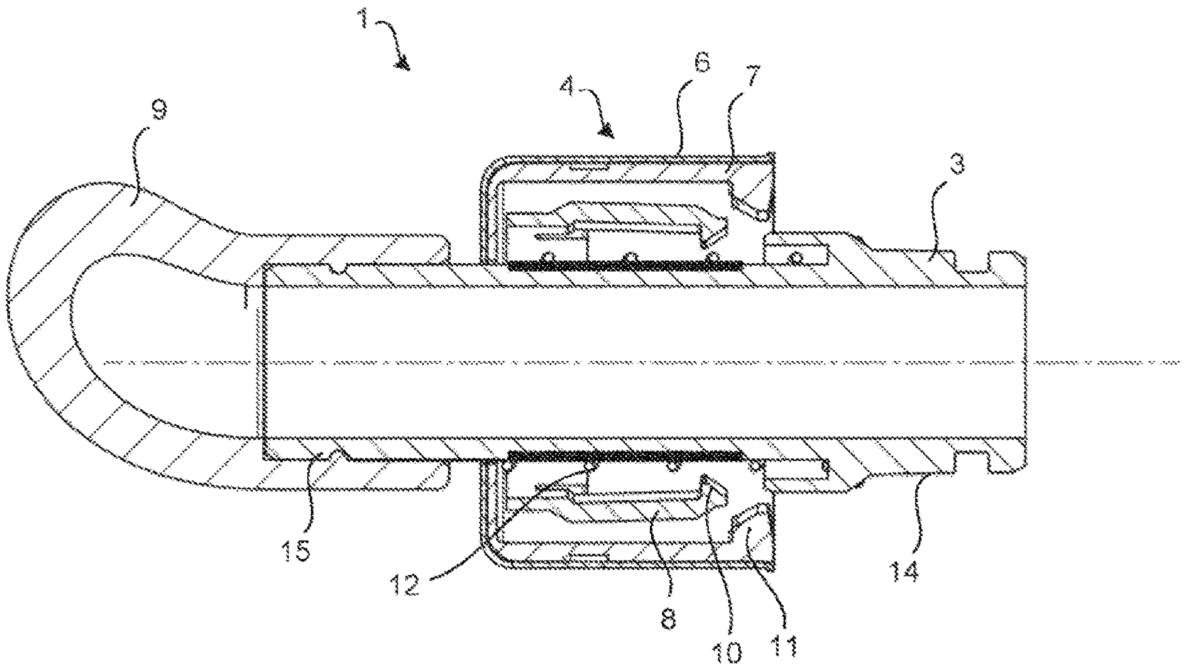
FIG. 1 is a schematic sectional diagram of a connector device according to an exemplary embodiment, in the state before latching or connecting to another component.

FIG. 1 shows a connector device 1 in a schematic diagram according to an exemplary embodiment. The connector device 1 has a main body 3, a receiving and/or transmitting device 5 arranged on the main body 3 for receiving and/or transmitting signals and/or data, and a shielding device 4, which is movable relative to the main body 3. The shielding device 4 is designed in three parts. It has a metal sleeve as a shielding element 6 for the electromagnetic shielding of the receiving and/or transmitting device 5. Furthermore, it has a clip ring 8, which has a latch 10 for latching the connector device 1 to the component 2 to be connected (not shown in FIG. 1) in a latching position. The latch 10 is designed as latching hooks. The shielding device 4 also has a receiving sleeve 7, which is arranged in the interior of the metal sleeve 6 and is fixedly connected to the metal sleeve 6. The clip ring 8 is arranged in the interior of the receiving sleeve 7. The receiving sleeve 7 has a lock 11 for securing the latch 10 in the latching position. The shielding device 4 or the metal sleeve 6, the receiving sleeve 7 and the clip ring 8 are axially movable relative to the main body 3. The component 2 to be connected (not shown) is intended to be connected to the connector device 1 or to the main body 3 at the component connection portion 14. At the opposite end, the main body 3 has a further component connection portion 15, at which a further component, which is designed as a hose sleeve in the exemplary embodiment shown, is connected. The connector device 1 also has a spring element 12, which, when the latch 10 are not latched, presses the shielding device 4 in a direction opposite the component connection portion 14.

Figure 2:
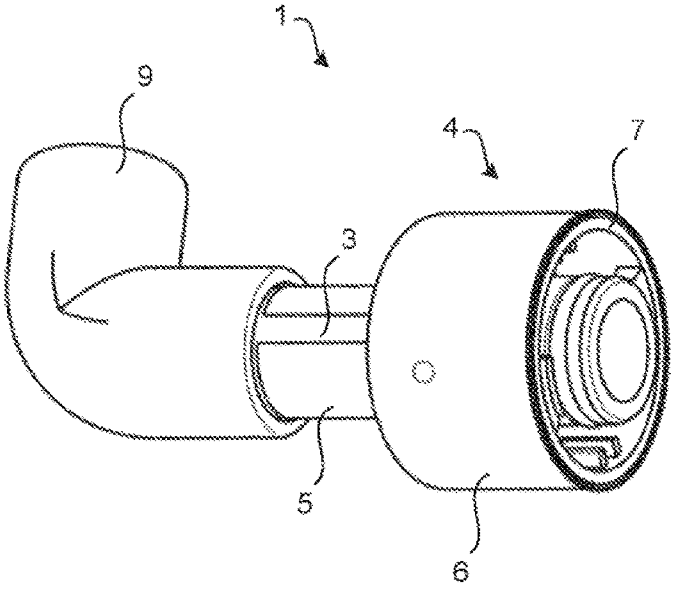
FIG. 2 is a perspective diagram of the connector device from FIG. 1.
Figure 3:
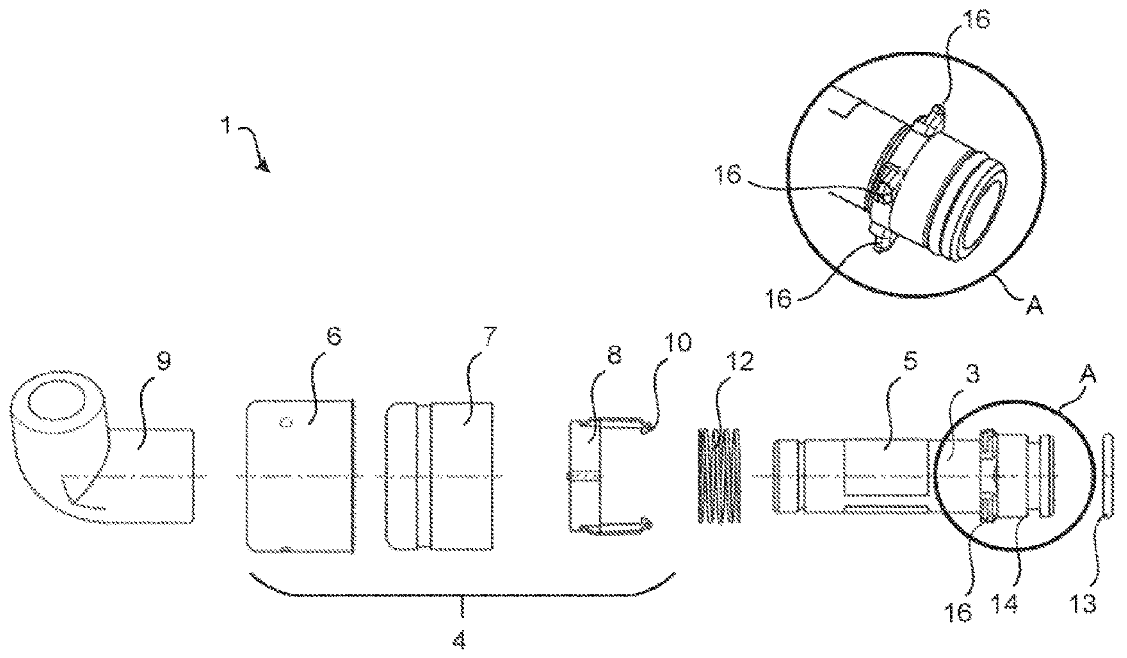
FIG. 3 is an exploded diagram of the connector device from FIG. 1.

In FIG. 2, the connector device 1 of FIG. 1 is shown in a perspective diagram. In FIG. 3, an exploded diagram of the connector device 1 is shown. Moreover, a partial region of the main body 3 is shown in a perspective view in a detail view A. It can be seen here that the main body 3 has an unlocking device 16, which is designed as slopes protruding from the rest of the main body 3.

Figure 4:
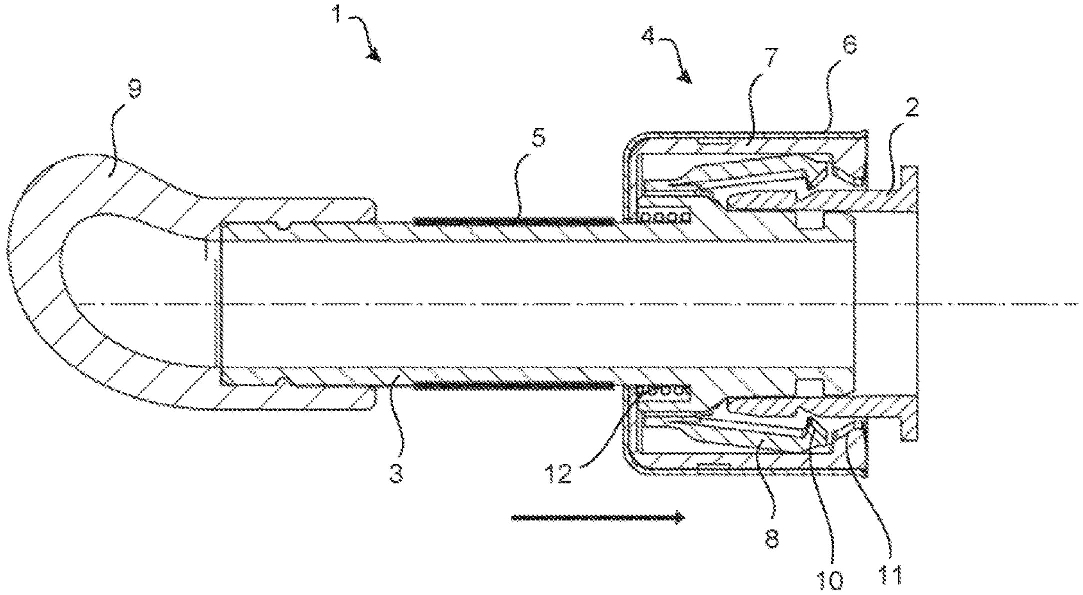
FIGS. 4 to 8 are schematic sectional diagrams of the connector device from FIG. 1 connected to a component.
Figure 5:
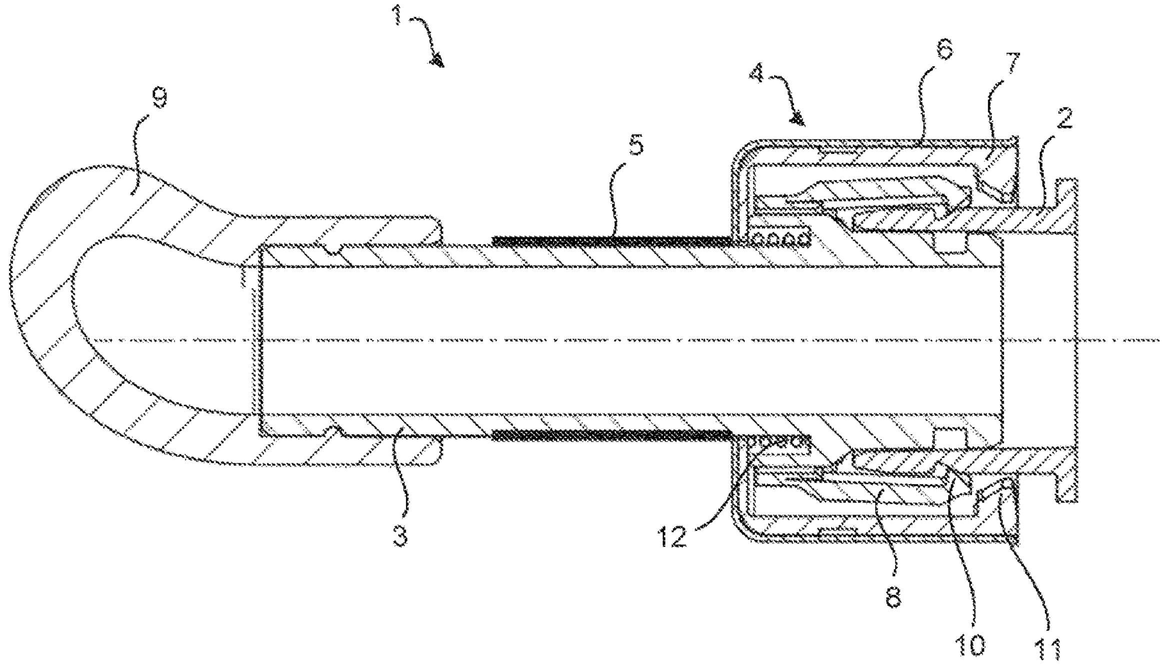
Figure 6:
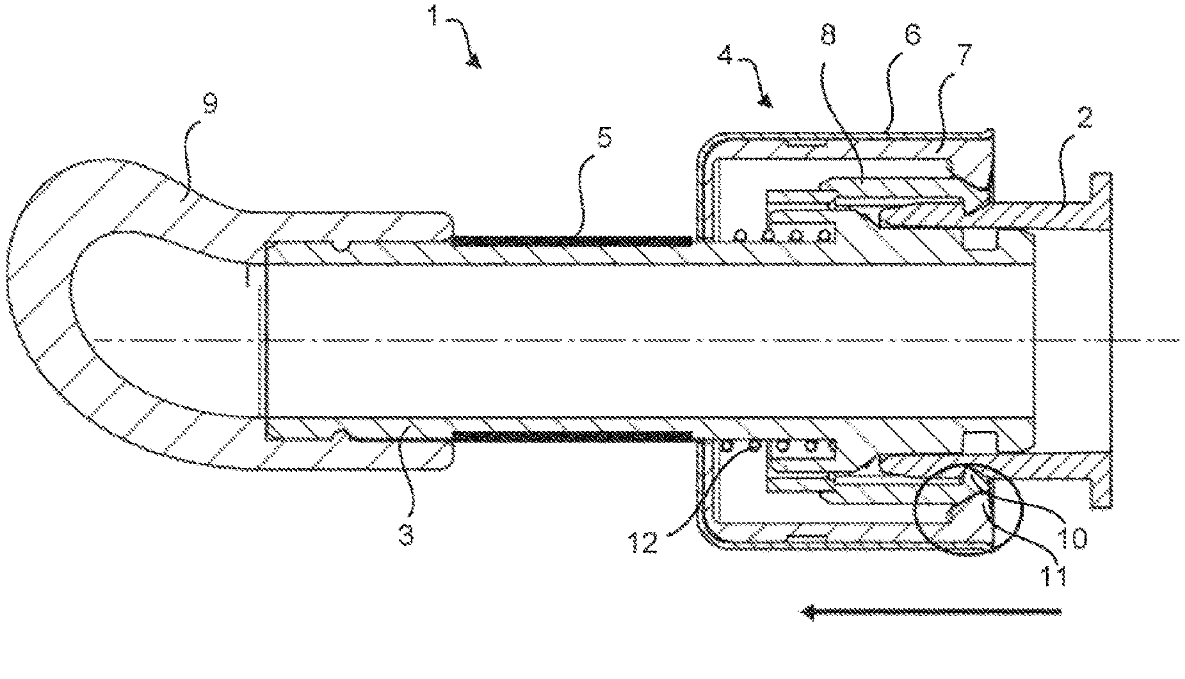

FIGS. 4 to 6 show the connector device 1 of FIG. 1 in different states in which the connector device 1 is connected to the component 2 to be connected. It can be seen here that the three-part shielding device 4 is moved in the direction of the component connection portion 14 or in the direction of the component 2 until the latching means 10 or latching hooks latch with a groove formed in the component 2. The shielding device 4 is then released, as a result of which the spring element or the spring 12 presses the shielding device 4 in a direction opposite the component connection portion 14 or the component 2. This means that the lock 11 presses on the latch 10, as a result of which the latching is secured.

In other words, during the assembly shown in connection with FIGS. 4 to 6, the connector device 1 is pushed, together with the shielding device 4 in which the clip ring 8 is installed, onto a correspondingly shaped counterpart of the component 2, and the shielding device 4 or the metal sleeve 6 of the shielding device 4 is pushed axially over the pipe so far that the latch 10 on the clip ring latch into the groove geometry provided on the pipe. When the shielding device 4 or the metal sleeve 6 is then released, it is pressed "backward" via the spring 12, as a result of which the lock 11 or "securing wedges" made in the receiving sleeve 7 presses the latch 10 or latching hooks of the clip ring 8 together and thus prevents opening. If the shielding device 4 or the metal sleeve 6 is released before the latches 10 are latched, the shielding device 4 including the clip ring 8 is pushed down again and again by the component 2 or by the pipe via the geometry of the shielding device 4 or of the metal sleeve 6 and of the receiving sleeve 7 and by the spring 12, as a result of which pseudo-latching cannot occur. Consequently, the shielding device 4 can remain in the displaced and correctly assembled position only when correctly assembled and when latching of the clip ring on the pipe has taken place. In all other cases, the shielding device 4 is pushed again and again into the original position, that is, over the receiving and/or transmitting device 5, so that the latter cannot be read.

Consequently, an installation of the connector device 1 can be secured without it being possible for pseudo-latching to occur. At the same time, it can be documented via the receiving and/or transmitting device 5 that the connector device 1 has been installed and also has been installed correctly.

Figure 7:
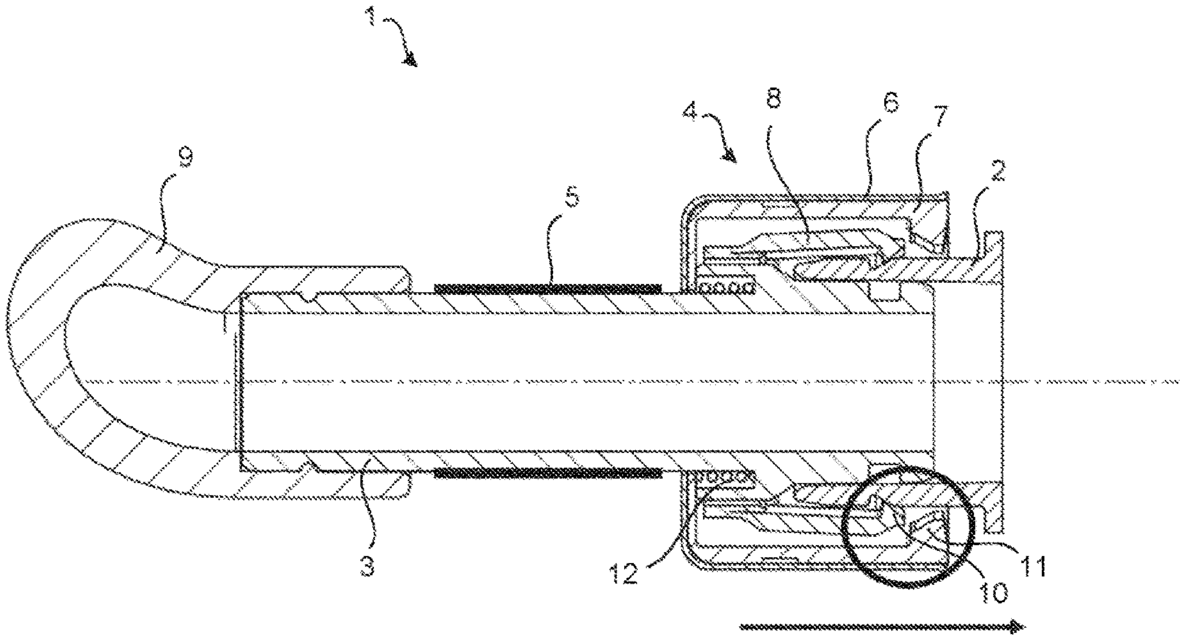
Figure 8:
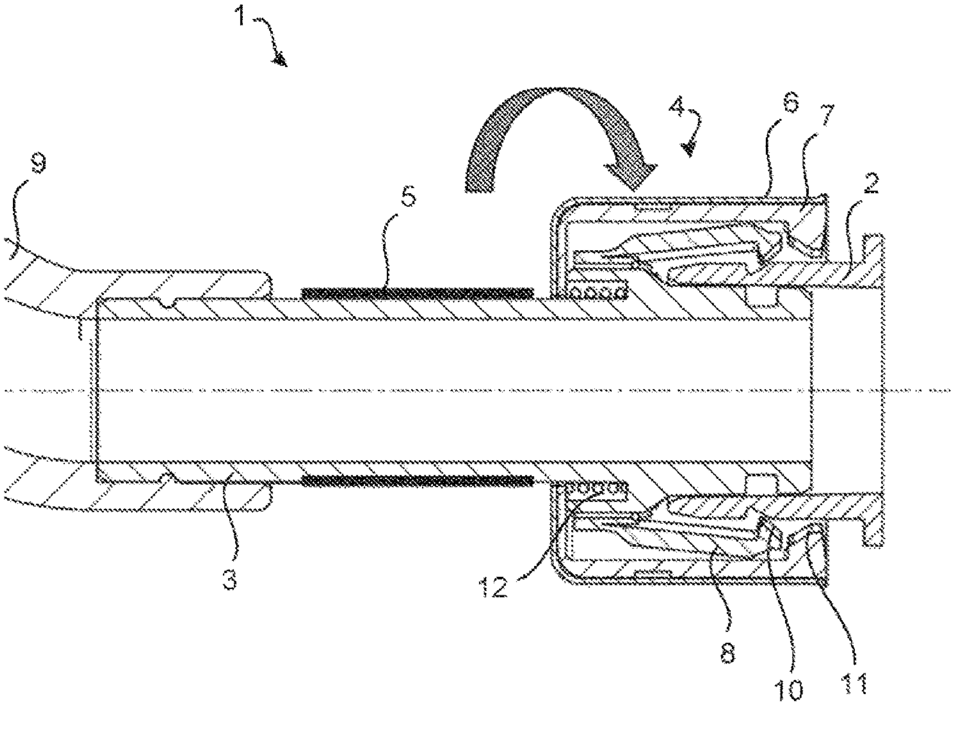

FIGS. 7 and 8 show disassembly of the connector device 1. The shielding device 4, which comprises the metal sleeve 6, the receiving sleeve 7 and the clip ring 8, is guided axially over the main body 3 of the connector device 1, wherein an axial relative movement between the clip ring 8 and the receiving sleeve 7 is possible. A relative rotation of the clip ring 8 and the receiving sleeve 7 is not possible, i.e. when the receiving sleeve 7 is rotated, the clip ring 8 is also necessarily rotated. This is used to allow unlatching of the shielding device 4 or of the connector device 1. By means of a counterclockwise or clockwise rotation of the metal sleeve 6 and/or receiving sleeve 7, the clip ring 8 is pushed onto an oblique plane on the main body 3 of the connector device 1 and thereby causes opening of the latch 10 or latching hooks on the clip ring 8, as a result of which the latching is undone. The oblique plane or the plurality of radially arranged triangles thus form the unlocking device 16 of the main body 3. To detach the shielding device 4 or the connector device 1, the receiving sleeve 7 must first be pushed forward until the wedged connection between the receiving sleeve 7 and the latch 10 is undone and then rotated counterclockwise or clockwise relative to the main body 3 of the connector device 1. The connection can then be undone.

Figure 9:
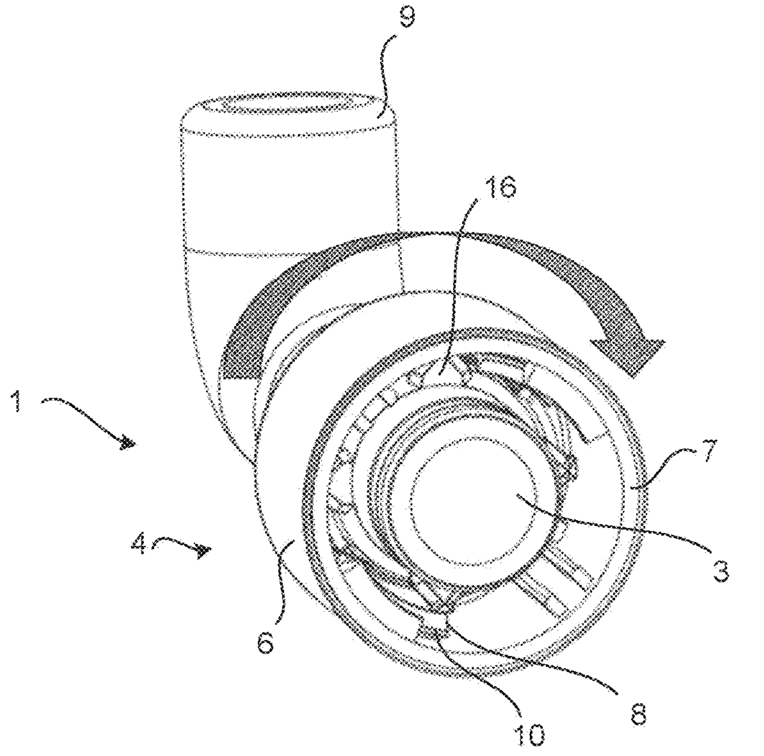
FIGS. 9 and 10 are further perspective diagrams of the connector device from FIG. 1.
Figure 10:
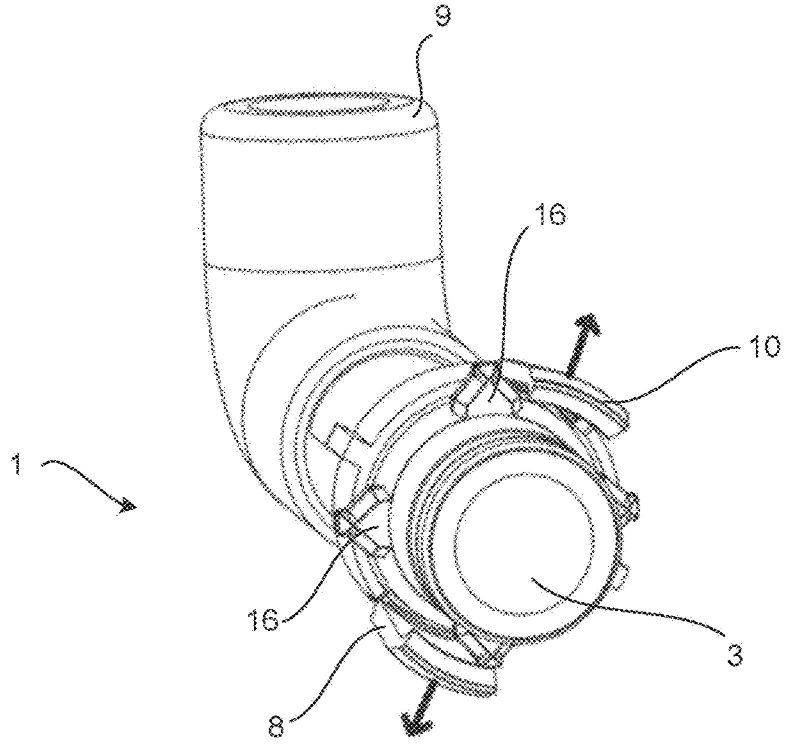

The disassembly or detachment of the connector device 1 is also shown in FIGS. 9 and 10, which each show a perspective diagram of the connector device 1. FIG. 10 shows the connector device 1 without the metal sleeve 6 and without the receiving sleeve 7 so that the latch 10 of the clip ring 8 and the unlocking device 16 of the main body 3 can be seen better.

The connector device 1 shown here allows a very simple assembly process for a latching mechanism, by simply pushing on a sleeve-like shielding device 4. Correct installation can be ensured by the connector device 1. Furthermore, pseudo-latching can advantageously be excluded.

Alternatively or additionally, the exemplary embodiments shown in the figures can have further features according to the embodiments of the general description.

LIST OF REFERENCE SIGNS

1 Connector device
2 Component
3 Main body
4 Shielding device
5 Receiving and/or transmitting device
6 Shielding element (shield)
7 Receiving sleeve
8 Clip ring
9 Further component
10 Latch
11 Lock
12 Spring element
13 Sealing element
14 Component connection portion
15 Further component connection portion
16 Unlocking device
A Detail view

What is claimed is:

1. A connector device for connecting to at least one component, comprising:
- a main body;
- a receiving and/or transmitting device arranged on the main body for receiving and/or transmitting signals and/or data; and
- a shielding device, which is arranged movably relative to the main body, the shielding device comprising:
  - a shield for electromagnetic shielding of the receiving and/or transmitting device,
  - a latch for latching the connector device to the component to be connected in a latching position,
  - a lock for securing the latch in the latching position, wherein
  - in the latching position, the receiving and/or transmitting device is free of shielding by the shield.

2. The connector device according to claim 1, further comprising:

a spring element, which is designed, when the shielding device is not in the latching position, to arrange the shield such that the receiving and/or transmitting device is shielded by the shield.

3. The connector device according to claim 1, wherein the shielding device is designed in multiple parts.

4. The connector device according to claim 1, wherein the shield is a metal sleeve.

5. The connector device according to claim 1, wherein the shielding device has a receiving sleeve, which comprises the lock.

6. The connector device according to claim 5, wherein the shielding device has a clip ring, which comprises the latch.

7. The connector device according to claim 1, wherein the shielding device has a receiving sleeve, a metal sleeve and a clip ring, which are connected to one another non-rotatably.

8. The connector device according to claim 7, wherein the clip ring is axially movable relative to the receiving sleeve and/or metal sleeve.

9. The connector device according to claim 8, wherein the clip ring is arranged in an interior of the receiving sleeve and/or metal sleeve.

10. The connector device according to claim 1, wherein the main body has an unlocking device, which is designed to bring the latch out of the latching position.

11. The connector device according to claim 10, wherein the unlocking device has one or more slopes protruding from the main body.

* * * * *